United States Patent
Gopalan et al.

(10) Patent No.: US 11,548,479 B2
(45) Date of Patent: Jan. 10, 2023

(54) MICRO-SIZED STRUCTURE AND CONSTRUCTION METHOD FOR FLUIDIC OSCILLATOR WASH NOZZLE

(71) Applicant: DLHBOWLES, INC., Canton, OH (US)

(72) Inventors: Shridhar Gopalan, Westminster, MD (US); Chunling Zhao, Ellicott City, MD (US); Zachary Kline, Burtonsville, MD (US)

(73) Assignee: DLHBOWLES, INC., Canton, OH (US)

( * ) Notice: Subject to any disclaimer, the term of this patent is extended or adjusted under 35 U.S.C. 154(b) by 0 days.

(21) Appl. No.: 15/769,105

(22) PCT Filed: Oct. 19, 2016

(86) PCT No.: PCT/US2016/057762
§ 371 (c)(1),
(2) Date: Apr. 18, 2018

(87) PCT Pub. No.: WO2017/070246
PCT Pub. Date: Apr. 27, 2017

(65) Prior Publication Data
US 2019/0061702 A1    Feb. 28, 2019

Related U.S. Application Data

(60) Provisional application No. 62/243,371, filed on Oct. 19, 2015.

(51) Int. Cl.
*B60S 1/52* (2006.01)
*B05B 1/08* (2006.01)
*B60S 1/56* (2006.01)

(52) U.S. Cl.
CPC ............... *B60S 1/522* (2013.01); *B05B 1/08* (2013.01); *B60S 1/52* (2013.01); *B60S 1/56* (2013.01); *B60S 1/524* (2013.01)

(58) Field of Classification Search
CPC .... B60S 1/52; B60S 1/522; B60S 1/56; B60S 1/524; B05B 1/08
(Continued)

(56) References Cited

U.S. PATENT DOCUMENTS 6,074,078 A    6/2000  Georgeff et al.
6,976,507 B1   12/2005 Webb
(Continued)

FOREIGN PATENT DOCUMENTS

JP    2004081900    3/2004

OTHER PUBLICATIONS

European Patent Office, Supplementary European Search Report for EP 16858155, dated May 27, 2019.
(Continued)

*Primary Examiner* — Jason J Boeckmann
(74) *Attorney, Agent, or Firm* — McDonald Hopkins LLC

(57) ABSTRACT

A micro-sized structure and construction method for a fluidic oscillator wash or spray nozzle (100 or 250) has a nozzle housing (110 or 252) enclosing an interior cavity (112 or 262) which receives an insert (114 or 254) having internal fluid passages defining first and second power nozzles (120, 122 or 280, 282). The power nozzles receive pressurized fluid (130) flowing through the interior cavity of the housing, where the fluid flows into the cavity at the bottom of the housing and flows upwardly to inlets (140, 142) for the power nozzles so that accelerating first and second fluid flows are aimed by the power nozzles toward one another in an interaction region (154 or 284) which exhausts laterally along a spray axis through a horn-shaped throat defined
(Continued)

partly within the insert and partly within the flared spray outlet orifice (160 or 290) defined through the sidewall (162) in the housing.

11 Claims, 13 Drawing Sheets

(58) Field of Classification Search
USPC .................................................... 239/589.1
See application file for complete search history.

(56) References Cited

U.S. PATENT DOCUMENTS

| | | |
|---|---|---|
| 7,036,749 B1 | 5/2006 | Steeman |
| 7,267,290 B2 | 9/2007 | Gopalan et al. |
| 8,172,162 B2 | 5/2012 | Gopalan et al. |
| 8,662,421 B2 | 3/2014 | Russell et al. |
| 2004/0227021 A1 | 11/2004 | Romack et al. |
| 2005/0028849 A1* | 2/2005 | Fukushima ............... B05B 1/08 134/198 |
| 2006/0226266 A1* | 10/2006 | Russell ..................... B05B 1/08 239/589.1 |
| 2011/0061692 A1* | 3/2011 | Gopalan .................... B60S 1/52 134/169 R |
| 2014/0145009 A1 | 5/2014 | Hartranft et al. |
| 2014/0263742 A1 | 9/2014 | Gopalan |
| 2014/0291423 A1 | 10/2014 | Gopalan et al. |

OTHER PUBLICATIONS

Patent Cooperation Treaty (PCT), International Search Report and Written Opinion for Application PCT/US2016/057762 Oct. 19, 2016, dated Jan. 9, 2017 International Searching Authority, US.
European Patent Office, Communication under Rule 71 for EP 16858155, dated Mar. 2, 2020.

\* cited by examiner

Spray fan pattern (Fan-50°, flow rate = 190ml/min at 35 psi)

MICRO-SIZED STRUCTURE AND CONSTRUCTION METHOD FOR FLUIDIC OSCILLATOR WASH NOZZLE

RELATED APPLICATION INFORMATION

This application is a 35 U.S.C. 371 national stage filing of PCT Application No. PCT/US2016/057762 filed on Oct. 19, 2016 entitled "Micro-sized Structure and Construction Method for Fluidic Oscillator Wash Nozzle", which claims priority to U.S. provisional application No. 62/243,371 entitled "Micro-sized Structure and Construction Method for Fluidic Oscillator Wash Nozzle", which was filed Oct. 19, 2015, the entire disclosure of which is hereby incorporated herein by reference.

BACKGROUND OF THE INVENTION

Field of the Invention

The present invention relates, in general, to fluid spraying nozzle assemblies, and more particularly to a micro-sized nozzle structure and method of construction for fluidic oscillator-equipped spray assemblies.

Discussion of the Prior Art

Fluidic type washer nozzles are well known for high efficiency (big coverage, high speed with low flow rate) spray performance. More recent fluidic oscillator equipped nozzle assemblies have improved performance with cold fluids (having viscosities of up to twenty-five centiPoise (25 cP)). Typical low flow, low pressure fluidic nozzle assemblies are highly compromised when forced to spray cold, viscous fluids. Prior art nozzles in smaller sizes are especially ineffective if low flow, low pressure (e.g., 15 psi or less) fluid is supplied, since those prior art nozzles cannot reliably generate an oscillating spray of droplets which provide satisfactory coverage and spray velocity to cover or clean a desired target surface. So a significant limitation of prior fluidic nozzles is that the nozzle assembly's package size needs to be large enough to handle the needed fluid flow; for example, the linear distance from the fluid inlet or feed to the exit orifice or front to back thickness customarily needs to be at least 6 mm for most fluidic circuits, especially if the spray application will include cold viscous fluids such as automotive windshield washing fluid or camera washing fluid, at very low temperatures (having viscosities of up to 25 cP).

For some applications, package size is a big concern due to very limited available space. Jet spray nozzles have been commonly used in such limited space applications, but because of their very narrow spray pattern, jet spray nozzles typically must incorporate high fluid flow rates or must be operated for longer spray durations to effectively clean a glass or external lens surface. Jet spray nozzles do have smaller package size than fluidic nozzles, but do not have effective spray patterns for many automotive cleaning applications such as cleaning a camera lens, where the surface must be cleaned well, and without requiring a mechanical wiper or the like.

Applicant's commonly owned prior work includes the "Cup-shaped nozzle assembly with integral filter structure" described in US 2014291423, the "Cup-shaped Fluidic Circuit, Nozzle Assembly and Method" described in US2014145009, and the "Integrated automotive system, compact, low profile nozzle assembly, compact fluidic circuit and remote control method for cleaning wide-angle image sensor's exterior surface" described in PCT/US15/25489, all of which are referenced for purposes of nomenclature and incorporated herein by reference, but these nozzle assemblies don't meet all of the needs of contemporary automotive designers.

The National Highway Safety and Transportation Administration (NHSTA) has mandated that by 2018 all vehicles must have a rearview camera. In addition, original equipment manufacturers (OEMs) continue to add cameras to see any point of the vehicle periphery (behind, to the side, or in front) and all of these cameras will need to be cleaned. For cosmetic and styling reasons, vehicle OEMs desire to have functional devices in a concealed package where possible. Being able to provide the desired function and performance without being obvious to the eye or intruding into other design space is a requirement for many industrial designers. Automotive designers thus want very compact nozzle assemblies for automotive washer nozzles, but also want an even spray distribution to provide effective cleaning. Automotive OEMs also want a nozzle which is very economical and versatile. For example, exterior trim assemblies often combine many functions, such as the Center High Mounted Stop Light ("CHMSL") light assemblies now required by US DOT regulations can include nozzle assemblies. CHMSL assemblies can include other features such as external cameras, but cleaning the lenses on those cameras becomes problematic if the automotive stylist's design for exterior trim is to be preserved.

There are many examples of automotive exterior trim assemblies with awkwardly incorporated spray nozzles which may preserve the aesthetic appearance of the automotive trim but do not generate a spray which will adequately cleanse a window or other surface. An early example is provided in U.S. Pat. No. 6,074,078 which, as illustrated in prior art FIGS. 1A-D reproduced herein, describes a vehicle 14 with an exterior panel or surface 12 including CHMSL trim assembly 10 having a lens 24 with a spray tip 70 configured to spray jets of washing fluid through apertures 77 from beneath nozzle hood 44. This nozzle configuration will reliably pour jets of washing fluid downwardly, generally onto the rear window or backlight glass of the vehicle, but little more can be said for the spray's ability to clean any particular surface. Nozzle configurations like that shown in FIGS. 1A-1D work well enough to clean a rear window if a wiper blade is also used, but the spray from this nozzle, alone, does little to clean the window. There is a need, therefore, for an effective and unobtrusive nozzle configuration system and method for generating certain kinds of sprays.

OBJECTS AND SUMMARY OF THE INVENTION

Accordingly, it is an object of the present invention to overcome the above mentioned difficulties by providing a micro-sized nozzle structure and construction method for a fluidic oscillator equipped wash or spray nozzle assembly.

In accordance with the present invention, a washer nozzle for automotive applications is featured which has a micro package size (e.g., 3 mm (thick)×3 mm (height)×7 mm (width)). The spray pattern of this nozzle is a uniform spray fan having a spray angle of 15°-80°, with a low flow rate of 50-350 ml/min at 22 psi, and wherein the spray fan may have a selected thickness of 6° to 25°, so the micro nozzle can produce a spray fan which is 15-80 degrees wide along a lateral width axis and 6 to 25 degrees thick in the transverse vertical height axis.

Applicants have discovered through testing of prototypes such as those described and illustrated herein that the nozzle assemblies of the invention function well with flow rates lower than 150 mL/min, perhaps even as low as 50 mL/min, and are effective for very small automotive camera lens and sensor wash applications. Since this nozzle configuration and method are intended for incorporation in a variety of automotive applications in addition to camera washing, CHMSL-mount rear wash nozzles and wiper-arm nozzle mounts are also illustrated, where both appear likely to require a scaling up of flow rate and dimensions (at least internal dimensions). The micro sized washer nozzle of the present invention has significant advantages of very small package size, low cost and surprisingly excellent spray performance for a nozzle assembly of such small size.

Briefly, the micro package size washer nozzle of the present invention includes a nozzle housing enclosing an interior volume which receives an insert having internal fluid passages defining opposing lateral inlets leading to first and second power nozzles communicating with an interaction region in the insert. The insert is generally rectangular, and is inserted or installed via a bottom opening in the housing and is forced upwardly to abut internal surfaces within interior side and top or end walls to position and secure it. The opposing lateral inlets of the insert communicate with interior fluid passageways in the housing to receive pressurized fluid from an interior volume, or lumen of the housing below the insert. Fluid flows into the lumen in the bottom of the housing from a fluid supply and flows upwardly to the lateral inlets and into the respective first and second power nozzles so that accelerating first and second fluid flows are aimed by the first and second power nozzles toward one another in the interaction region defined within the interior of the insert. A transverse spray outlet for the nozzle assembly is aligned to the side, along a transverse spray axis, and that spray outlet is configured as a flared or expanding horn-shaped spray orifice formed by a throat aperture in fluid communication with the insert's interaction chamber which (upon insertion) is aligned with the throat aperture or transverse lumen defined through a sidewall in the nozzle housing. The throat aperture or lumen is a vertically aligned slot shaped opening which is centered over and in communication with the interaction region of the insert. The cross sectional shape of the throat or outlet orifice is defined by the housing sidewall's symmetrically aligned curved surfaces.

Fluid under pressure supplied to the housing flows upwardly to the inlets and into the opposing power nozzles to produce flow jets, fed through the opposed first and second power nozzles, which collide and interact within the housing's interaction region to generate oscillating flow vortices in the interaction region, and those flow vortices are then forced outwardly and discharge as a flat fan spray from the throat window or outlet orifice along the transverse spray axis.

In an exemplary embodiment, the aperture size of throat window is rectangular and small in area (e.g., 0.7 mm×0.35 mm). In order to make injection molding tools for manufacturing this nozzle assembly, the fluidic oscillator's interaction region and outlet orifice or throat window is defined within or formed by both the insert's interaction region upper wall and lower wall and the housing's throat orifice which flares outwardly along the spray axis.

Applicants' optimized nozzle design provides a compact package that allows the nozzle to be located closer to a vehicle-mounted camera's objective lens surface periphery and so is more readily integrated into the camera body or a surrounding vehicle trim piece. Being positioned closer to the camera lens(es) would be expected to create cleaning performance issues with typical nozzle designs as they may not be able to distribute the available fluid flow evenly across the camera lens(es) to clean those surfaces well. This is due to deficiencies in prior art nozzle designs; namely poor spray velocity profiles and narrow spray angles, and those deficiencies are overcome by the nozzle assembly of the present invention. Applicants' micro nozzle is more compact but has a surprisingly wide, high velocity spray, given its size. Its smaller size will satisfy Industrial Designers' aesthetic demands and will not impair or project into the image sensor's viewing area, even for cameras with large viewing angles. Additionally, the nozzle assemblies of the present invention produce a well-defined spray with high viscosity liquids, which is needed for good spray performance in cold environments, more specifically, the spray pattern of applicants' nozzle is a uniform spray fan having a spray angle of 15°-80°, with a low flow rate of 50-350 ml/min at 22 psi, and wherein the spray fan may have a selected thickness of 6° to 25°, so the micro nozzle can produce a spray fan which is 15-80 degrees wide along a lateral width axis and 6 to 25 degrees thick in the transverse vertical height axis. Satisfactory spray and cleaning performance are provided with low fluid supply pressures (e.g., 15 psi and lower pressures) and with cold viscous fluids (having viscosities of up to 25 cP). The camera wash applications for applicants' micro nozzle could include, but are not limited to, cameras used in parking assist or other driver assistance or self-driving features such as, but not limited to, lane departure warning, sign recognition, and auto-braking. These cameras could be located in the vehicle grill, the vehicle tailgate or liftgate, the vehicle trunk lid, side-view mirrors, or be roof-mounted.

The small package size and nozzle configuration of the present invention has advantages for spraying applications all over a car and thus will find advantageous applications in spray applications not related to camera washing. For example, a minimal packaging dimension in the direction of a spray exit flow is desirable for wiper-arm mounted nozzles in order to have the nozzle size be similar to or less than the width of the wiper arm. The nozzle assembly of the present invention is well suited for attachment on an automotive windshield wiper's arm with minimal adverse effect on the driver's visibility. Windshield washer flow rates are typically higher than camera wash flow rates, but to accommodate this need for a higher flow, the nozzle assembly and method of the present invention may readily be scaled up, or multiple nozzles may be positioned and aimed along the length of each wiper arm to generate plural aligned cooperating simultaneous sprays configured and aimed to distribute fluid over a large windshield or other target area.

Another area where the small size of the nozzle assembly of the present invention is desirable is for rear window wash nozzles located in a Center High Mount Stop Light ("CHMSL") trim assembly. Wash nozzles incorporated in the CHMSL assembly or trim piece (e.g., 10, as shown in FIGS. 1A and 1B) typically include a shear or jet type nozzle incorporated in a stop indicator light above the back light or rear window of a vehicle and such devices typically generate excessively high flow rates and relatively poor fluid distribution. For styling reasons, the nozzle usually is cylindrical in shape with a diameter in the range of 4-8 mm and extends out beyond the surface of the CHMSL less than 5 mm. While a traditional fluidic nozzle cannot fit in this packaging envelope, the nozzle assembly of the present invention can fit and generates a spray with better fluid distribution across the rear glass.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

DESCRIPTION OF THE PREFERRED EMBODIMENT

Figure 1A:
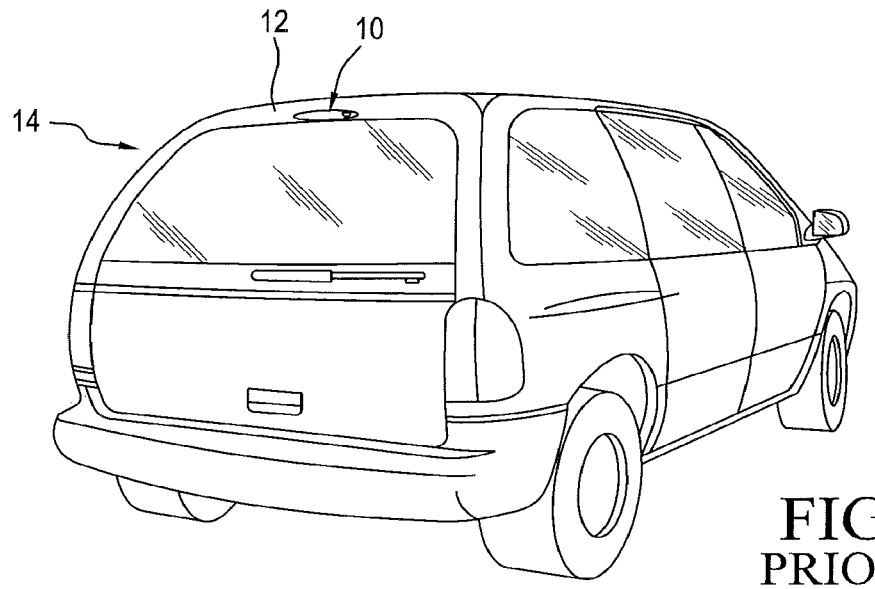
FIGS. 1A-1D illustrate a vehicle having a traditional Center High Mount Stop Light ("CHMSL") trim assembly including a nozzle configured to pour non-oscillating jets or streams of cleaning fluid onto the vehicle's rear window or back light, in accordance with the Prior Art.
Figure 1B:
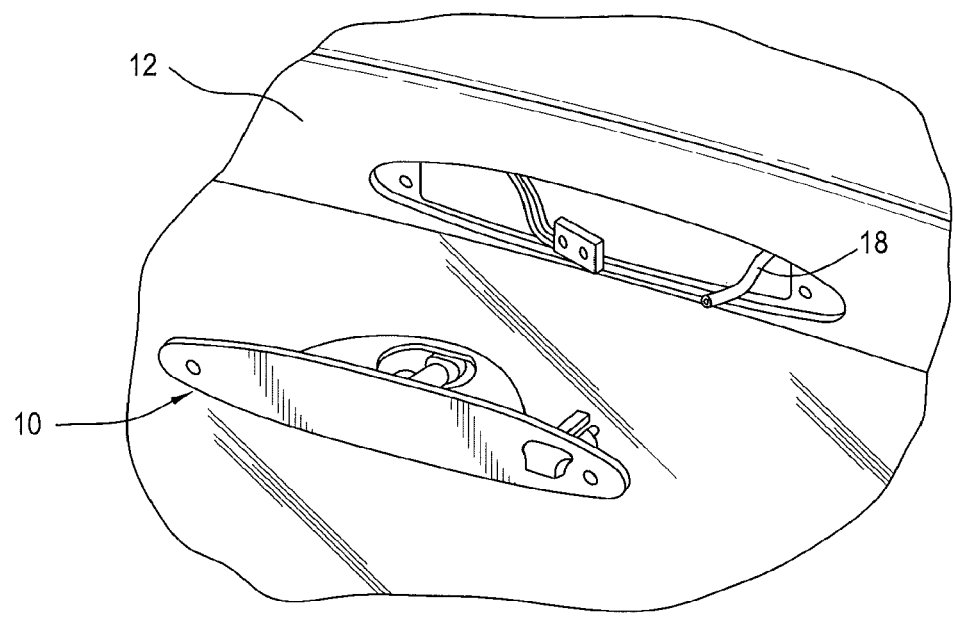
Figure 1C:
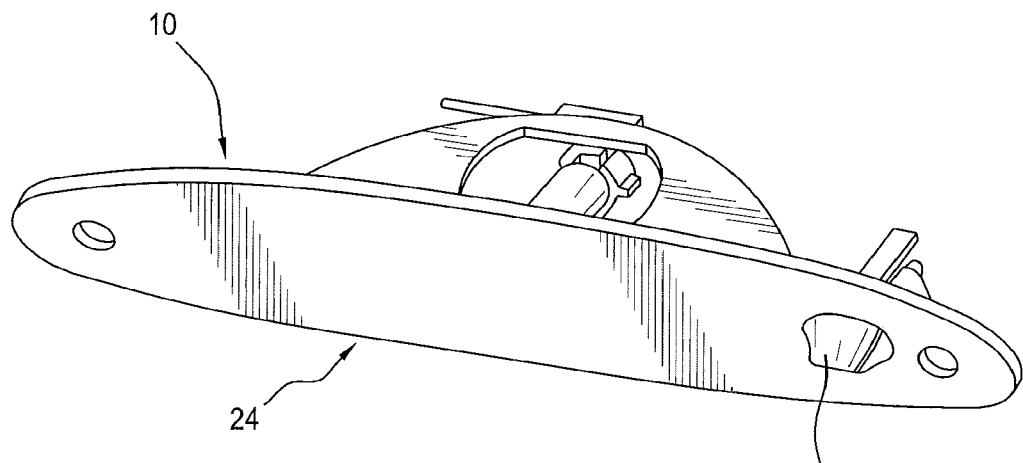
Figure 1D:
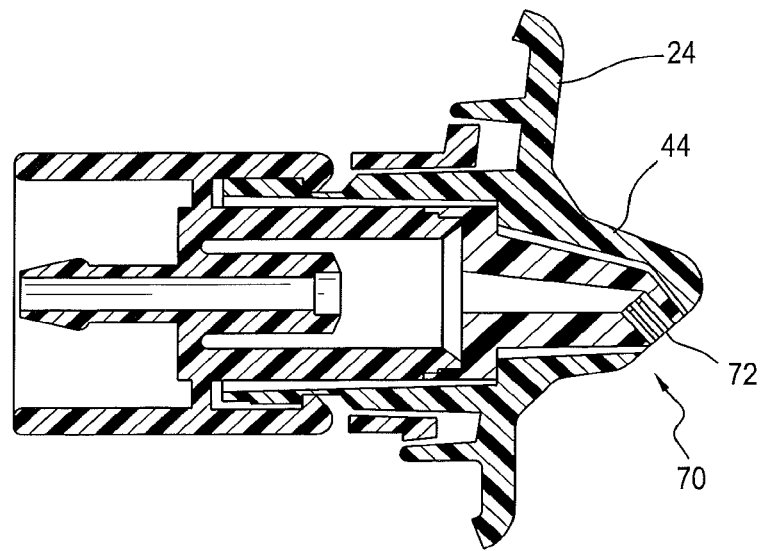

As illustrated in FIGS. 1A to 1D it is known in the prior art to locate rear window wash nozzles for a vehicle 10 in a Center High Mount Stop Light ("CHMSL") trim assembly 12. Such wash nozzles, as illustrated in FIGS. 1B and 1C at 14 are incorporated in the CHMSL assembly or trim piece 14 as shown in the exploded view of FIG. 1B, and typically include a shear or jet type nozzle such as that illustrated in cross-section in prior art FIG. 1D. Such a nozzle may be incorporated in a stop indicator light 24 above the back light or rear window 26 of vehicle 14 and includes a housing 44 which receives a spray head assembly 70 incorporating spray orifices 72 to direct fluid downwardly onto the window surface. Such devices typically generate excessively high flow rates and relatively poor fluid distribution. For styling reasons, the nozzle usually is generally cylindrical in shape with a diameter in the range of 4-8 mm and extends out beyond the surface of the CHMSL less than 5 mm. While a traditional fluidic nozzle cannot fit in this packaging envelope, the nozzle assembly of the present invention can fit and generates a spray with better fluid distribution across the rear glass. Modern automobiles sometimes incorporate a compact back-up camera (not shown) into trim pieces such as trim assembly 10, and the back-up camera lens will likely become soiled and require cleaning. Since the camera and any associated spray nozzles required for cleaning should be as visually inconspicuous as possible, yet provide effective sprays.

Turning now to a detailed description of the nozzle assembly and compact spray nozzle member of the present invention, FIGS. 2A-9 illustrate specific, illustrative embodiments for spray nozzle configurations and methods for selecting and aiming the nozzles to provide desired sprays. All of the illustrated embodiments provide a very compact spray head design which reliably generates a spray fan or pattern which evenly distributes a desired fluid (e.g., water or other cleaning fluids) over a surface by generating a spray fan of selected angular spread; for example a lateral spread of between 15° to 80°. The spray nozzle assemblies and compact shear spray nozzle members of the present invention are well suited for mounting in various configurations on an automobile, and for integration into an automotive exterior trim piece such as Center High Mounted Stop Light ("CHMSL") assembly such as that illustrated in FIG. 1A at 10 for use on a vehicle 14. The nozzle assemblies and nozzle members described below are easily incorporated very inconspicuously into an exterior panel of a vehicle's or incorporated in an external component such as a side mirror assembly to provide external surface washing and in a preferred application, to provide a very compact camera wash nozzle in cases where an external viewing camera is provided.

Figure 2A:
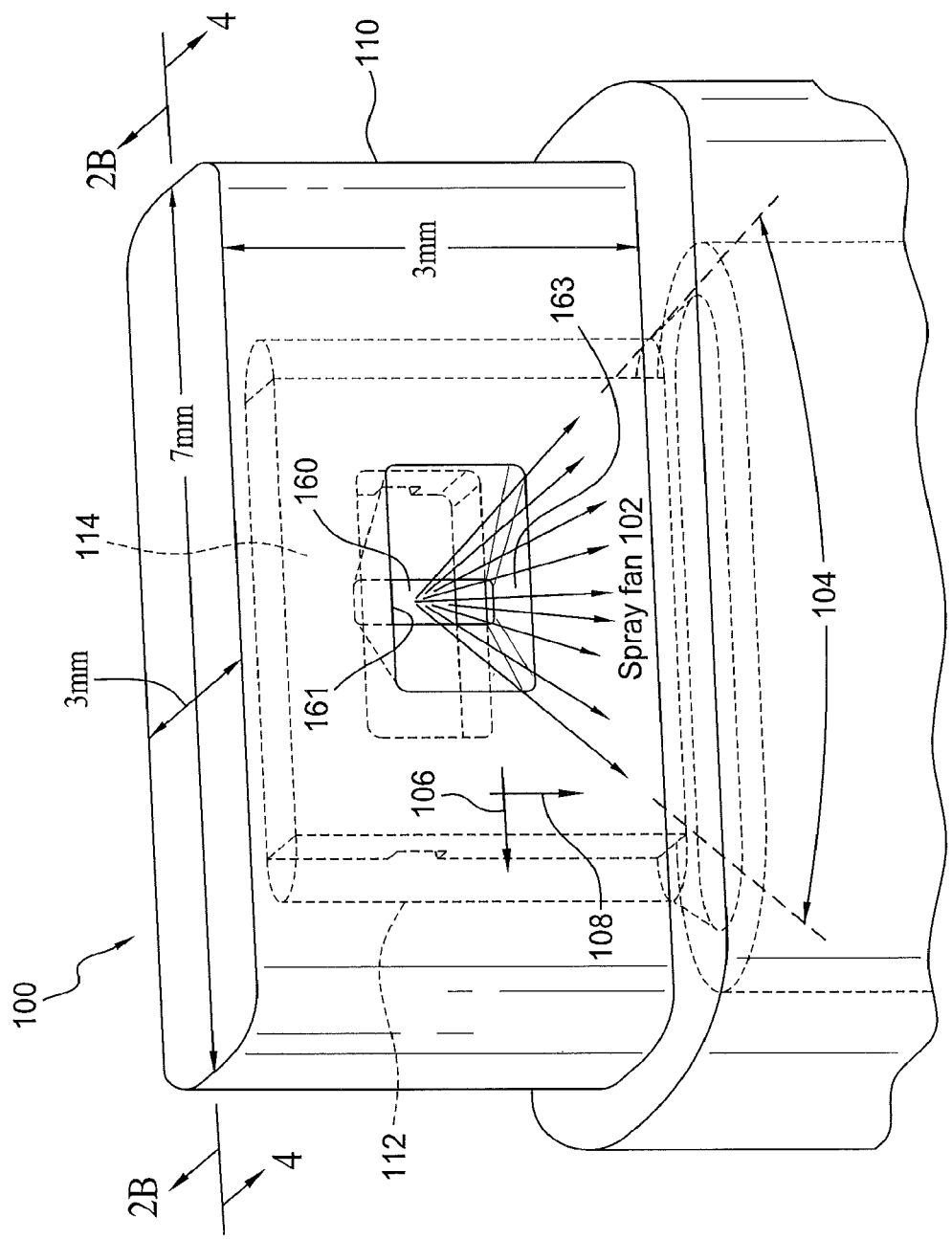
FIG. 2A is a front perspective view of a first embodiment of the micro-sized nozzle assembly of the present invention, illustrating a housing having a spray outlet orifice.

A first embodiment of the invention is illustrated in FIGS. 2A-5B, wherein a washer nozzle assembly 100 is provided for automotive applications and which incorporates a "micro" package size (e.g., 3 mm (thick)×3 mm (height)×7 mm (width)) as indicated by the dimensions provided in FIG. 2A. The nozzle assembly 100 is configured, in accordance with the invention, to provide a uniform outlet spray pattern, or fan, 102 over a lateral angle 104 of between 15° and 80° on the lateral axis 106, with a low flow rate of (50-350 ml/min at 22 psi). The spray fan may also have a selected thickness of 6° to 25° on a vertical axis 108 transverse to the axis 106, as illustrated in the figure, meaning the micro nozzle 100 can produce a spray fan 102 which is 15-80 degrees wide in a lateral plane illustrated by the lateral width axis 104 and 6 to 25 degrees thick in a vertical or height plane illustrated by axis 108 transverse to the lateral plane.

Applicants have discovered, through testing of prototypes of the illustrated embodiments, that for certain camera wash applications, with flow rates lower than 150 mL/min, and in some tests even as low as 50 mL/min, the nozzle assemblies of the invention function well. Since these nozzle configurations and methods are also suitable for incorporation in automotive applications other than camera wash, CHMSL-mount rear wash nozzles and wiper-arm nozzle mounts are illustrated (see, e.g., FIG. 7), although both of these applications appear likely to require a scaling up of flow rate and dimensions (at least internal dimensions). The micro sized washer nozzle 100 of the present invention has significant advantages of very small package size, low cost and surprisingly good spray performance.

Figure 2B:
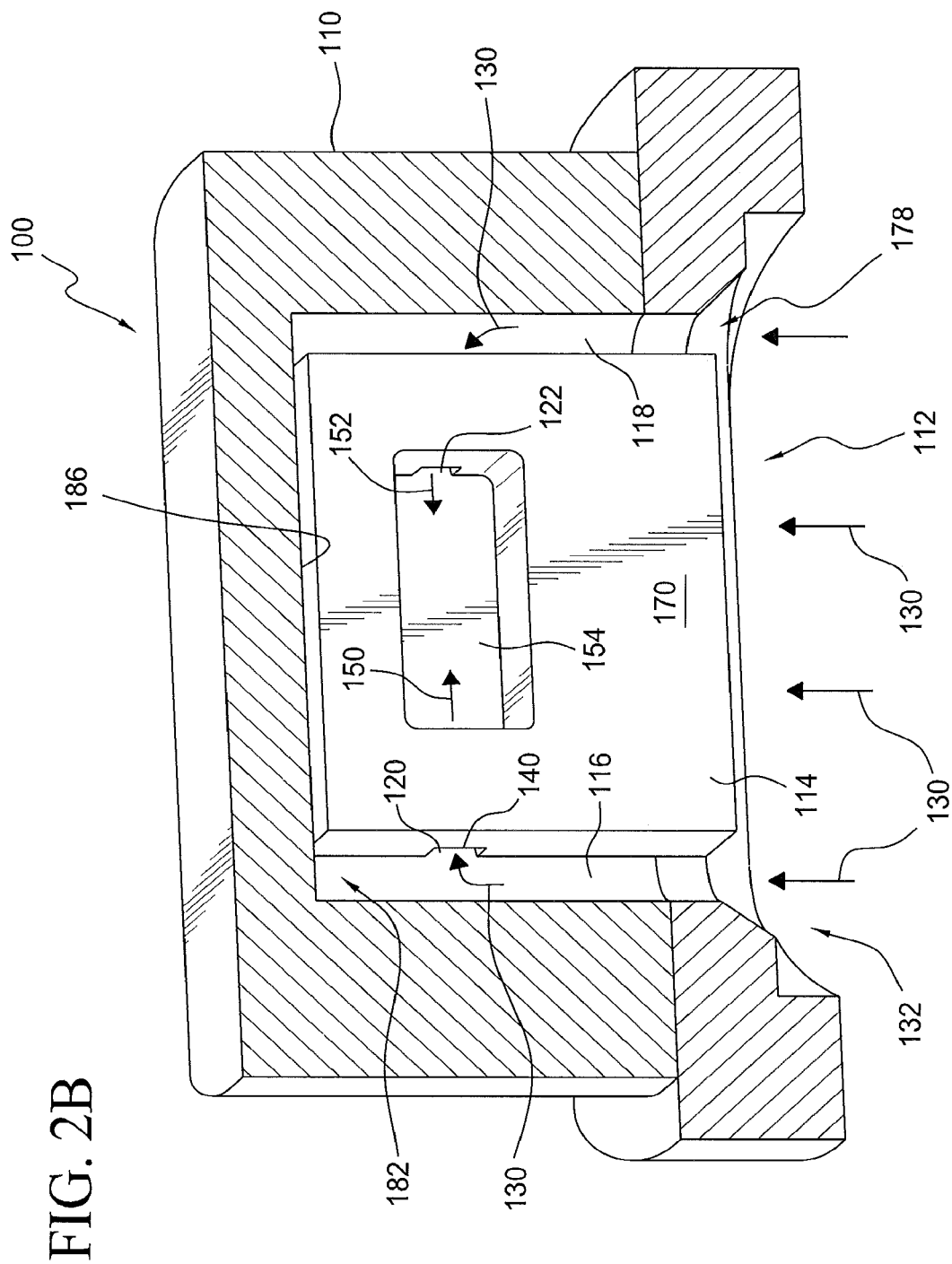
FIG. 2B is a cross-sectional view taken along lines 2B-2B of the micro-sized nozzle assembly of FIG. 2A, illustrating the configuration of an insert within the housing's interior volume and the fluid flow paths defined between the housing's interior sidewalls and the insert member's fluid passage defining features.
Figure 3:
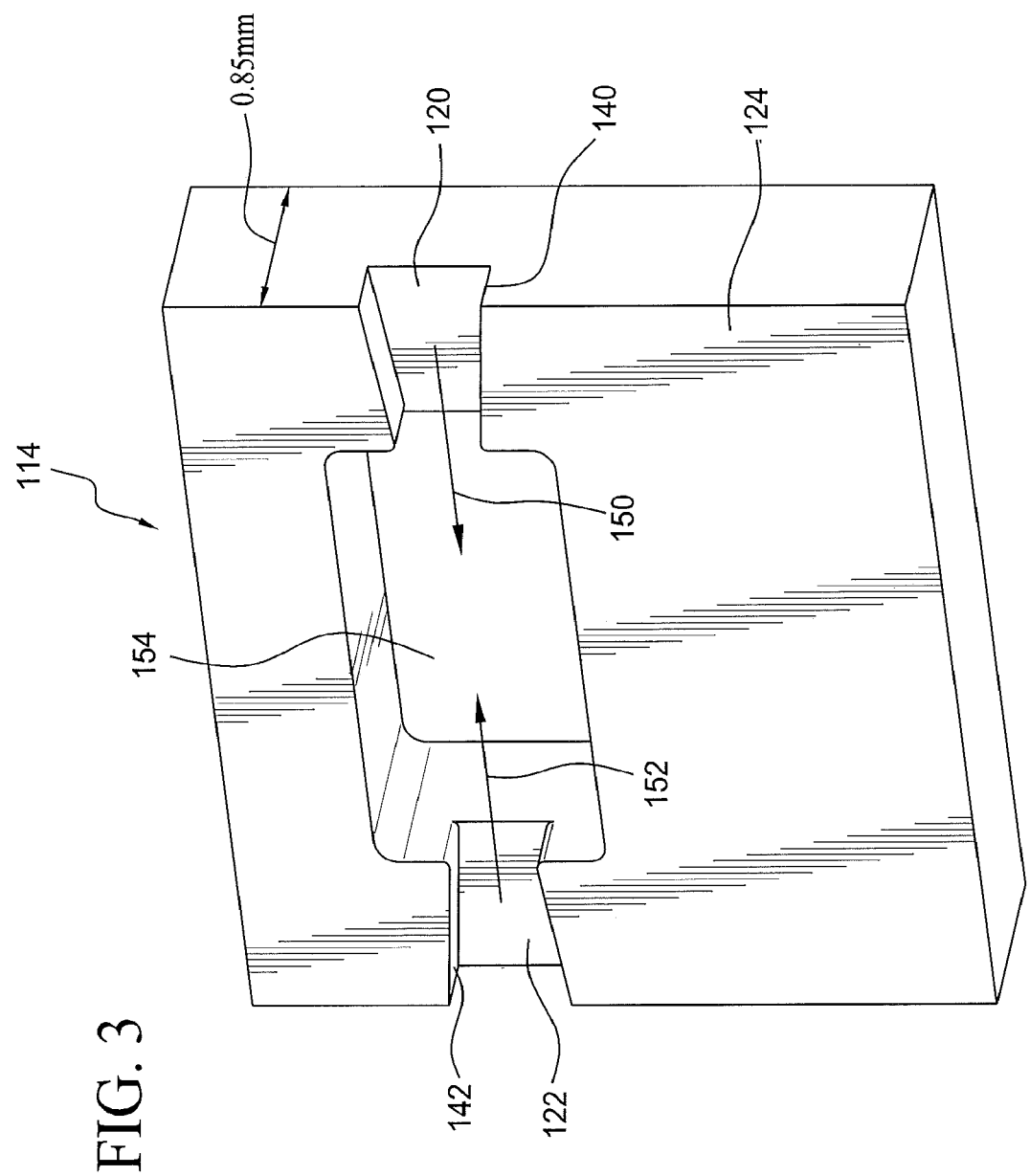
FIG. 3 is a diagram which illustrates an insert with opposed power nozzle passages for directing fluid flow into a central interaction region in the micro-sized nozzle assembly of FIGS. 2A and 2B, in accordance with the present invention.
Figure 4:
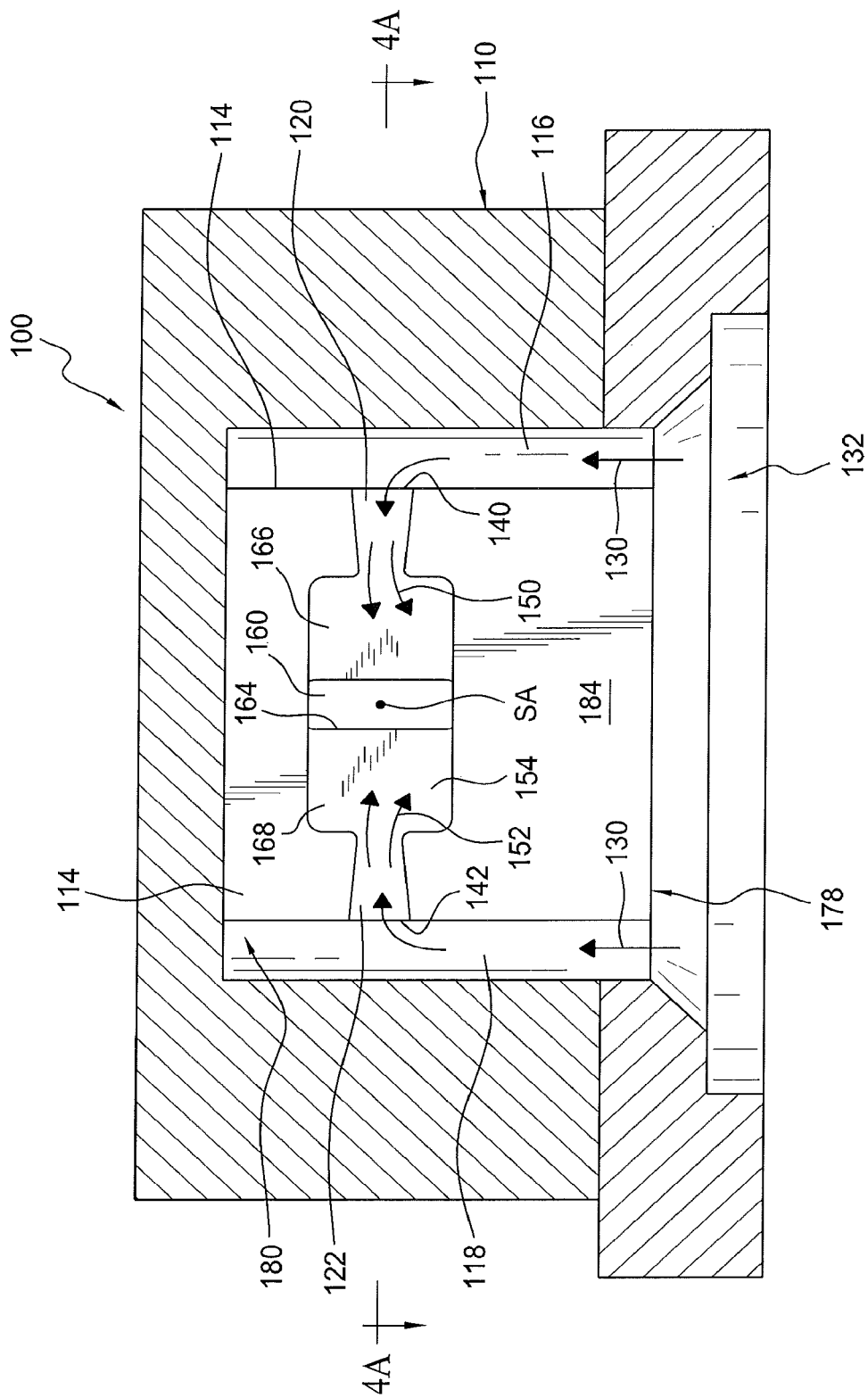
FIG. 4 is a cross-sectional view taken along lines 4-4 of the micro-sized nozzle assembly of FIG. 2A, and illustrates fluid flow paths into and within an insert interaction chamber in the micro-sized nozzle assembly structure of the present invention.

Referring now to the illustrated micro package size washer nozzle assembly 100 in greater detail, and with particular reference to FIGS. 2A, 2B, and 3, the assembly includes a nozzle housing 110 enclosing an interior cavity 112 which is shaped to receive and hold a fluid flow guide insert plate 114. As best illustrated in FIG. 2B, which is a cross-section of the housing 110 taken along section lines 2B-2B of FIG. 2A to illustrate the insert plate 114, the cavity 112 includes internal fluid passages 116 and 118 extending along the opposite edges of the insert 114 and leading to first and second power nozzles 120 and 122, defined in one surface 124 of the insert 114 (see FIG. 3). The nozzle assembly receives pressurized fluid to be sprayed, indicated by arrows 130, in an open lumen 132 in the bottom of the interior cavity 112 of the housing. This fluid is supplied by a pressurized source (not shown), as by way of a suitable conduit, and flows through the pair of fluid passageways, or channels 116 and 118 along opposite edges of the insert 114 to corresponding, opposing lateral power nozzle inlets 140 and 142 on the insert edges leading to the first and second power nozzles 120 and 122, respectively. The cross sectional or lumen areas for inlets 140 and 142 of this exemplary embodiment are 0.4 mm by 0.3 mm and preferably taper to a smaller cross sectional or lumen area toward the interaction region or chamber 154, as seen in FIG. 4. The opposing power nozzles accelerate corresponding first and second fluid flows 150 and 152 into interaction region 154 which is formed in and extends through the insert 114 and has a height of 0.9 mm in the embodiment illustrated in FIG. 3. The power nozzles direct the respective fluid flows 150 and 152 toward each other and into the interaction region 154 to force opposing fluid jets to collide and interact and create vortices which generate an oscillating outlet spray, in the manner known in fluidic oscillators.

Figure 4A:
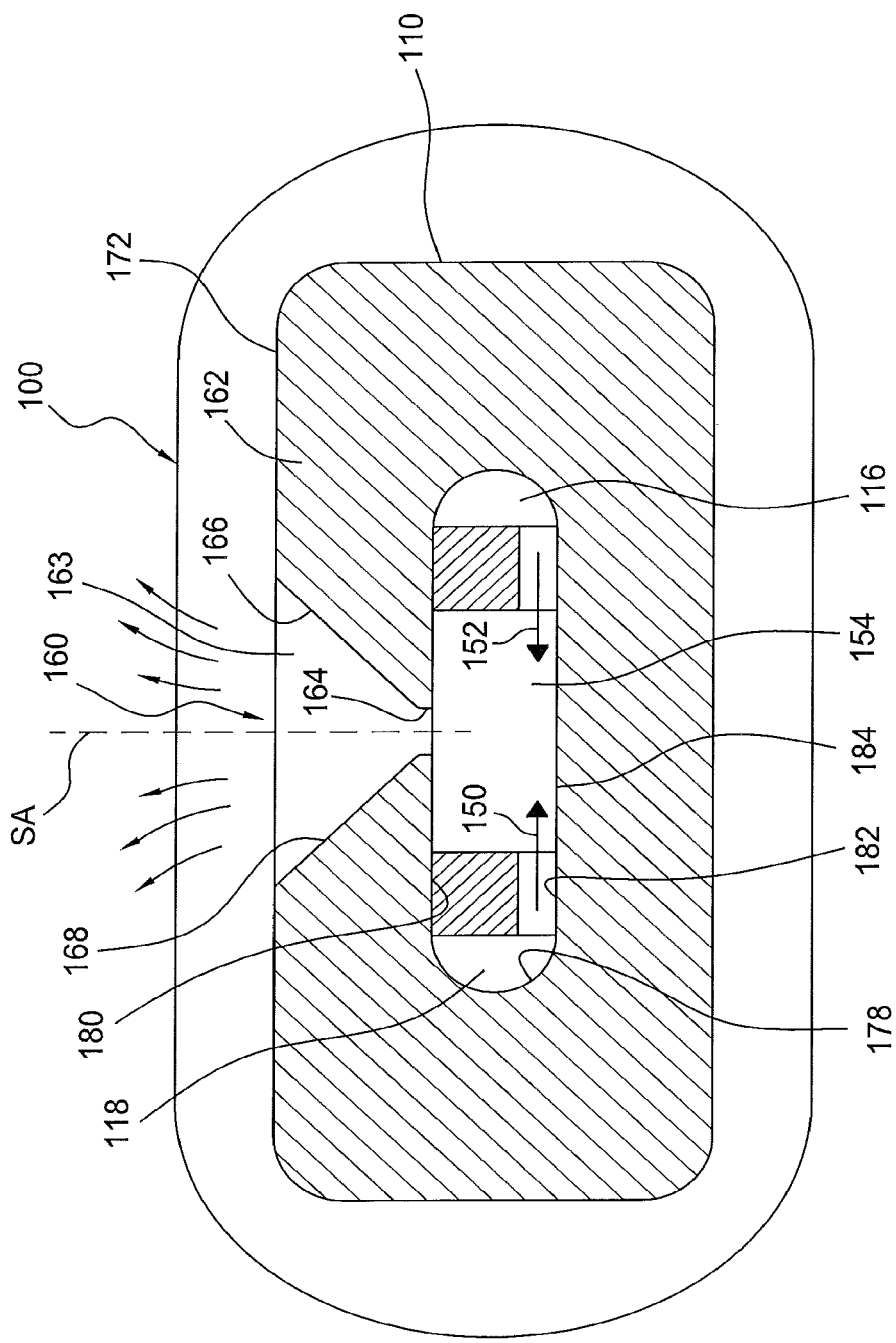
FIG. 4A is a cross-sectional view the micro-sized nozzle assembly of FIGS. 2A and 4, taken along lines 4A-4A of FIG. 4, and illustrating the symmetrically flared throat of the outlet orifice, in accordance with the present invention.
Figure 5A:
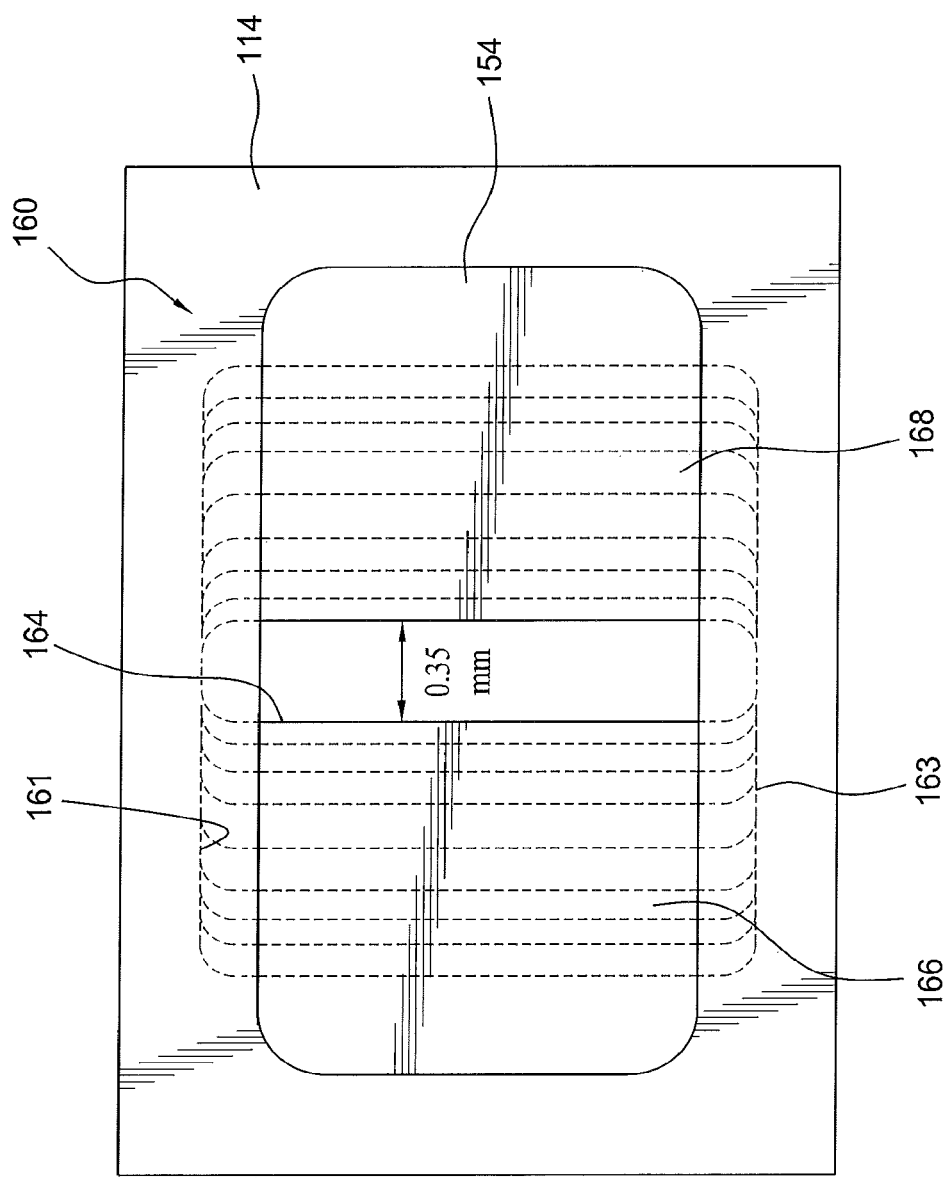
FIG. 5A is an enlarged view of a throat window as viewed from within the insert interaction chamber, illustrating the alignment of the throat window with the insert's interaction chamber in the micro-sized nozzle assembly of FIGS. 2-4B, in accordance with the present invention.
Figure 5B:
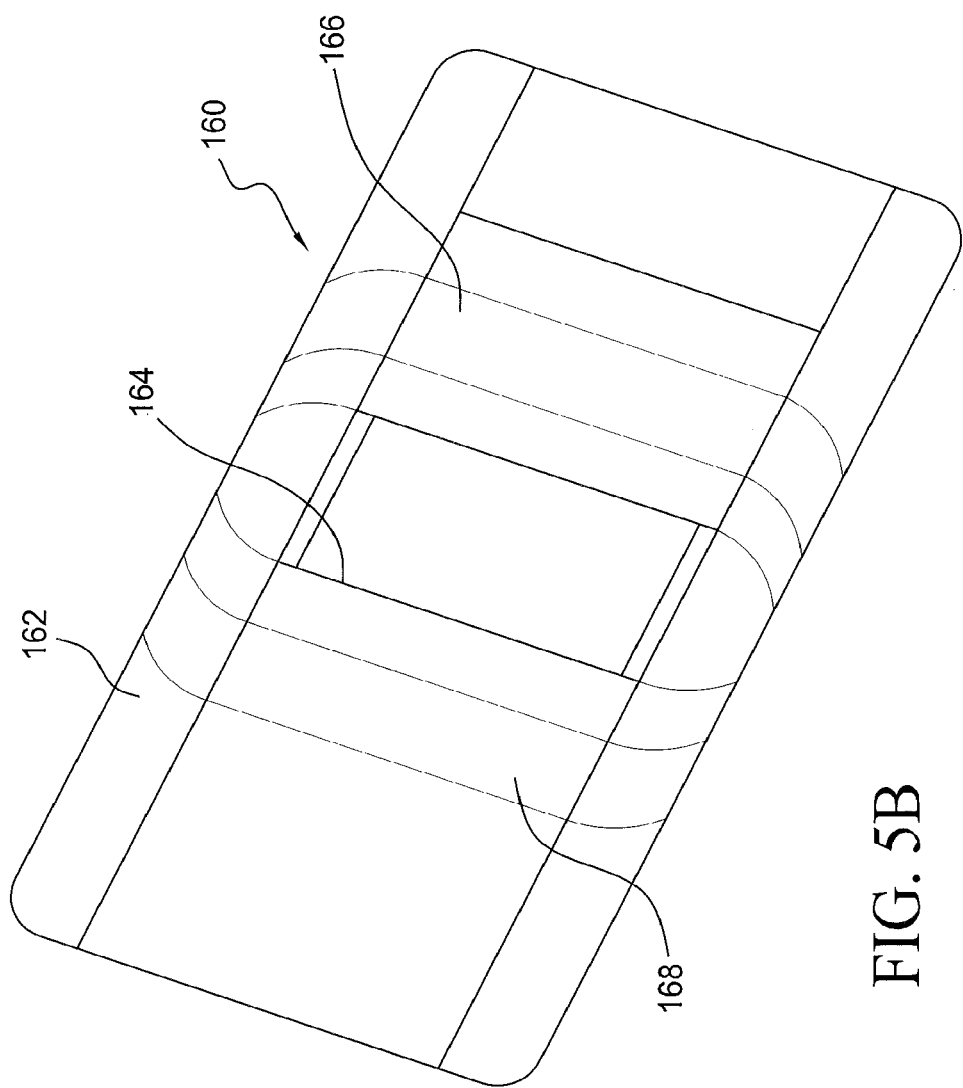
FIG. 5B is a perspective view from the outside of the housing, illustrating the outlet orifice throat window of FIG. 5A as defined by insert and its alignment with the housing's flared sidewall wall features, in accordance with the present invention.

The nozzle assembly 100 incorporates a throat or spray outlet orifice 160, which is a transverse lumen symmetrically defined around central spray axis SA through front sidewall 162 of the nozzle housing 110. Spray outlet orifice 160 and spray axis SA are aligned with the approximate center of the interaction region 154 of the insert 114 when the insert is seated in the housing. As best illustrated in FIG. 4 (which is a cross-sectional view taken at lines 4-4 of FIG. 2A), and in FIG. 4B (which is a cross-sectional view taken at lines 4B-4B of FIG. 2A), and as also illustrated in the partial views of FIGS. 5A and 5B (which illustrate the throat 160 as viewed from within the interaction chamber 154 in plan and perspective views) the interaction chamber of fluidic oscillator of the present invention is defined by the box shaped chamber 154 within insert and, upon insertion, the throat 160 defined in housing sidewall 162 is defined by outwardly flared curved sidewall segments 166, 168 defined in the exterior surfaces of the sidewall of housing 110. The vertically aligned rectangular shape of the throat or outlet orifice entry 164 defines the origin or window which exhausts the fluid spray along spray axis SA, and the flared or horn-shaped housing sidewall aperture extends distally along the spray axis. In the illustrated embodiment the outlet aperture or throat window 164 is a small rectangular lumen with a height of 0.7 mm and a width of 0.35 mm. In the illustrated example, the nozzle assembly's throat 160 is defined by upper and lower substantially planar and parallel upper and lower wall segments 161 and 163 bounded by curved left and right side wall segments 166 and 168. In order to make manufacturing of the nozzle assembly 100 more efficacious, the outlet orifice 160 is formed by both the interaction chamber 154 where it meets the throat window 164 and by the flared sidewalls 166 and 168. The outwardly and distally curving side walls 166 and 168 form curved surfaces through the thickness of the front wall 162 of the housing 110, curving outwardly and distally from the inner surface of the housing, which is in contact with the forward surface 170 of the insert 114, toward the forward or distal outer surface 172 of housing 110 to form the widest portion of the opening defining aperture 160. The pressurized, oscillating fluid 150, 152 from the power nozzles is forced out of the interaction region through the throat 160 formed by the curved walls and an oscillating spray is projected distally oscillating about the spray axis to generate a fan-shaped spray pattern 102 illustrated in FIGS. 2A and 4A.

In order provide the micro dimensions of the assembly of the present invention and to minimize the nozzle assembly's thickness, assembly of the nozzle structure, or assembly 100, is carried out by providing the housing 110 with an interior cavity 112 that is shaped to tightly receive the generally rectangular insert 114. This cavity includes the downwardly-opening lumen 132 at its bottom, with the lumen extending upwardly as a narrow internal slot 178 having front and rear interior walls 180 and 182 spaced apart far enough to receive the insert and to contact the corresponding front and rear walls 170 and 184 of the insert 114. The insert is installed in the housing through the open bottom of lumen 132 and is forced upwardly into slot 178 to engage the front and rear side walls of the housing and to abut a top wall interior surface 186 within the housing. The narrow slot 178 is enlarged at its opposite sides to provide the fluid channels 116 and 118 to allow fluid flow into the insert power nozzles, as described above.

Figure 6:
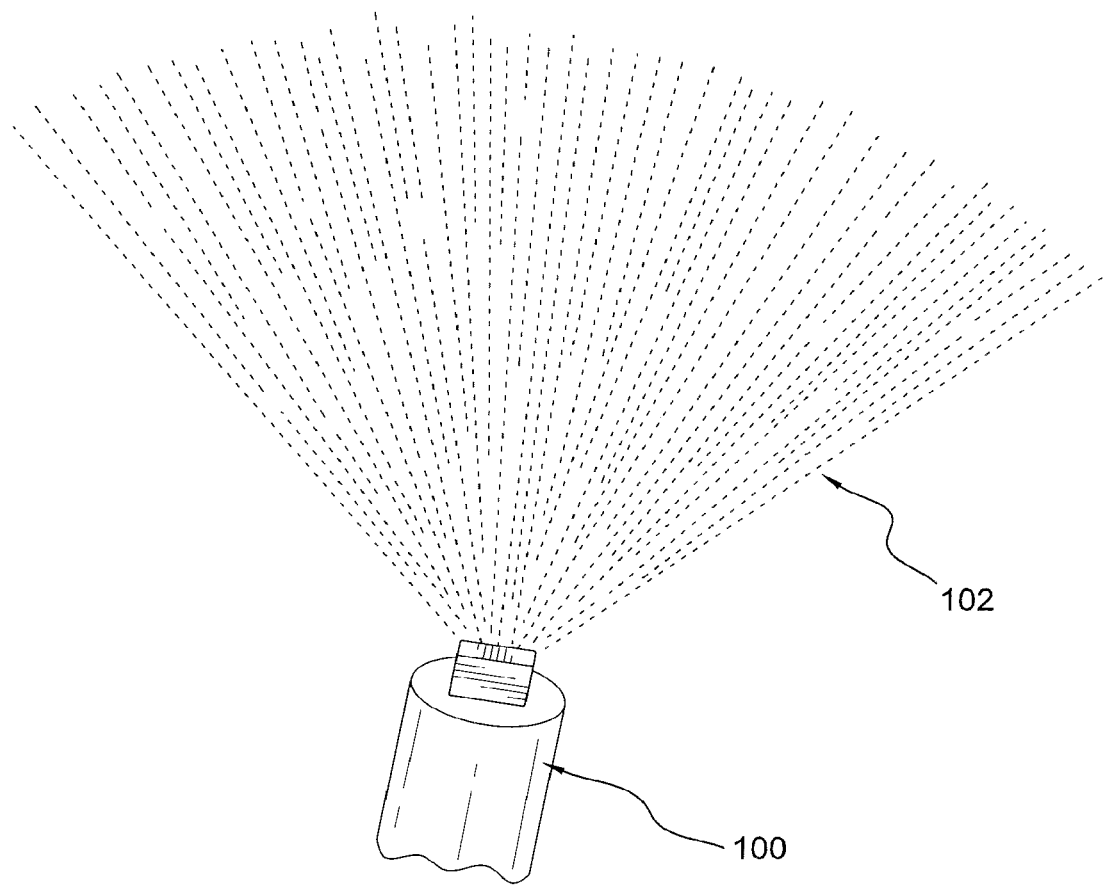
FIG. 6 is a side view illustrating a spray fan pattern generated by the micro-sized nozzle assembly of FIGS. 2-5B, in accordance with the present invention.

When in use, fluid 130 under pressure flows into and through through the first and second power nozzles 120 and 122 to produce opposed streams 150 and 152 which are aimed to collide within the housing's interaction region 154 to generate oscillating flow vortices in the interaction region (as shown in FIGS. 3 and 4). Those flow vortices are then forced out of the interaction region through the throat region defined by walls 150 and 152 and through orifice 164 to discharge as the flat fan spray 102. Testing with a prototype of nozzle assembly 100, as illustrated in FIG. 6, shows that the nozzle of the present invention functions well with flow rates lower than 150 mL/min, as low as 50 mL/min and, when properly configured, as high as 350 ml/min (at 22 psi). The illustrated spray fan pattern 190 had an angle of 50 degrees and a flow rate of 190 ml/min at 35 psi. Since this nozzle configuration and method are intended for incorporation in a wide variety of automotive applications, and not solely as a camera wash, CHMSL-mount rear wash nozzles and wiper-arm nozzle mounts are described below. It is noted that in such applications it appears likely that a scaling up of flow rate and dimensions (at least internal dimensions) will be required.

Applicants' optimized nozzle design provides a compact package that allows the nozzle to be located closer to a camera's objective lens surface periphery and possibly even more readily integrated into a camera body or surrounding vehicle trim piece. Being positioned closer to the camera lens(es) creates performance issues with typical nozzle designs as they may not be able to distribute the available fluid flow evenly across the camera lens(es). Further, the deficiencies of prior art nozzles; namely, poor spray velocity profiles and narrow spray angles that prevent effective cleaning, are overcome by the nozzle assembly 100 described herein. Applicants' nozzle 100 is more compact but generates a surprisingly wide, high velocity spray, given its size. Its smaller size will satisfy Industrial Designers' aesthetic demands and will not impair or project into the image sensor's viewing area, even for cameras with large viewing angles while producing a well-defined spray with high viscosity liquids, as is needed for good spray performance in cold environments, more specifically, the spray pattern of nozzle 100 is a uniform spray fan having a spray angle of 15°-80°, with a low flow rate of 50-350 ml/min at 22 psi, and wherein the spray fan may have a selected thickness of 6° to 25°, so the micro nozzle 100 can produce a spray fan which is 15-80 degrees wide along a lateral width axis and 6 to 25 degrees thick in the transverse vertical height axis. Satisfactory spray and cleaning performance are provided with low fluid supply pressures (e.g., 15 psi and lower pressures) and with cold viscous fluids (having viscosities of up to 25 cP). Its smaller size will satisfy Industrial Designers demands but also not impair the viewing area of large viewing angle cameras. These cameras could include, but are not limited to, cameras used in parking assist or other driver assistance or self-driving features such as, but not limited to, lane departure warning, sign recognition, and auto-braking. These cameras could be located in the vehicle grill, the vehicle tailgate or liftgate, the vehicle trunk lid, side-view mirrors, or be roof-mounted.

Figure 7:
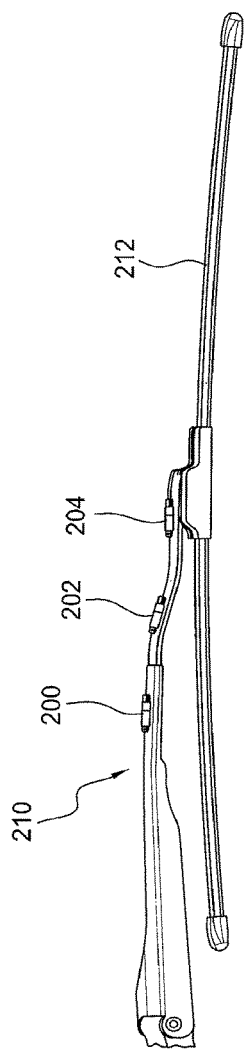
FIG. 7 is a side perspective view illustrating a windshield wiper assembly including a wiper arm member which supports and orients an array of three micro fluidic oscillator wash or spray nozzles of the present invention.

As noted above, the nozzle configuration provided by the small package size of the present invention has advantages for spraying applications all over a car, and this will find advantageous applications in spray applications not related to camera washing. For example, as illustrated in FIG. 7, the minimal packaging size in the direction of spray exit provided by the present invention is desirable for mounting multiple nozzles 200, 202 and 204 on a wiper arm 210, which may carry a conventional wiper blade 212. The micro nozzles of the invention allow the nozzle to be similar in size to or less than the width of the wiper arm so the nozzles can be positioned on the wiper arm with minimal visibility. Since windshield washer flow rates are typically higher than camera wash flow rates, the design may readily be scaled up or multiple nozzles may be positioned and aimed along the length of each wiper arm to generate plural aligned cooperating simultaneous sprays configured and aimed to distribute fluid over a large windshield or other target area.

Figure 8:
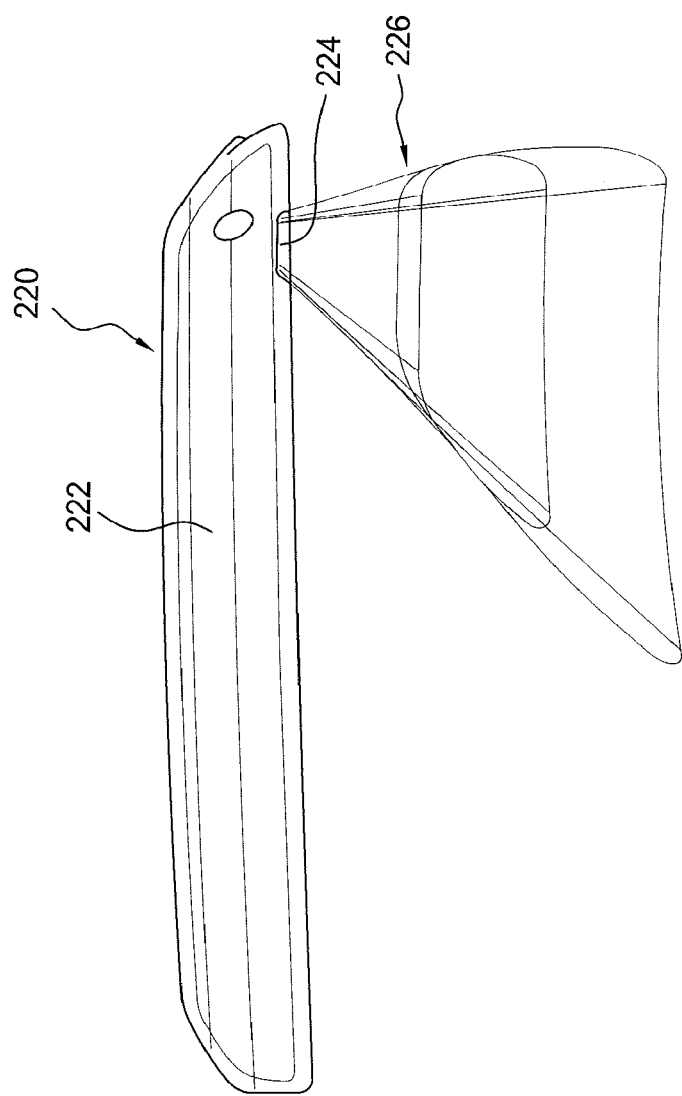
FIG. 8 is a front perspective view illustrating a CHMSL housing assembly which incorporates micro fluidic oscillator wash or spray nozzle of FIGS. 2-6, in accordance with the present invention.

Another area where the small size of the design would be desirable is for rear window wash nozzles located in a CHMSL assembly 220, as shown in FIG. 8. The CHMSL assembly may include a stop indicator light 222 located above the rear window of a vehicle, and is traditionally packaged with a nozzle of a shear or jet type, resulting in excessively high flow rates and relatively poor fluid distribution. For styling reasons, the nozzle usually is cylindrical in shape with a diameter in the range of 4-8 mm and extends out beyond the surface of the CHMSL less than 5 mm. While a traditional fluidic nozzle cannot fit in this packaging envelope, a nozzle 224 incorporating the present design can fit and can provide a better fluid distribution across the rear glass, as indicated by spray pattern 226.

Figure 9:
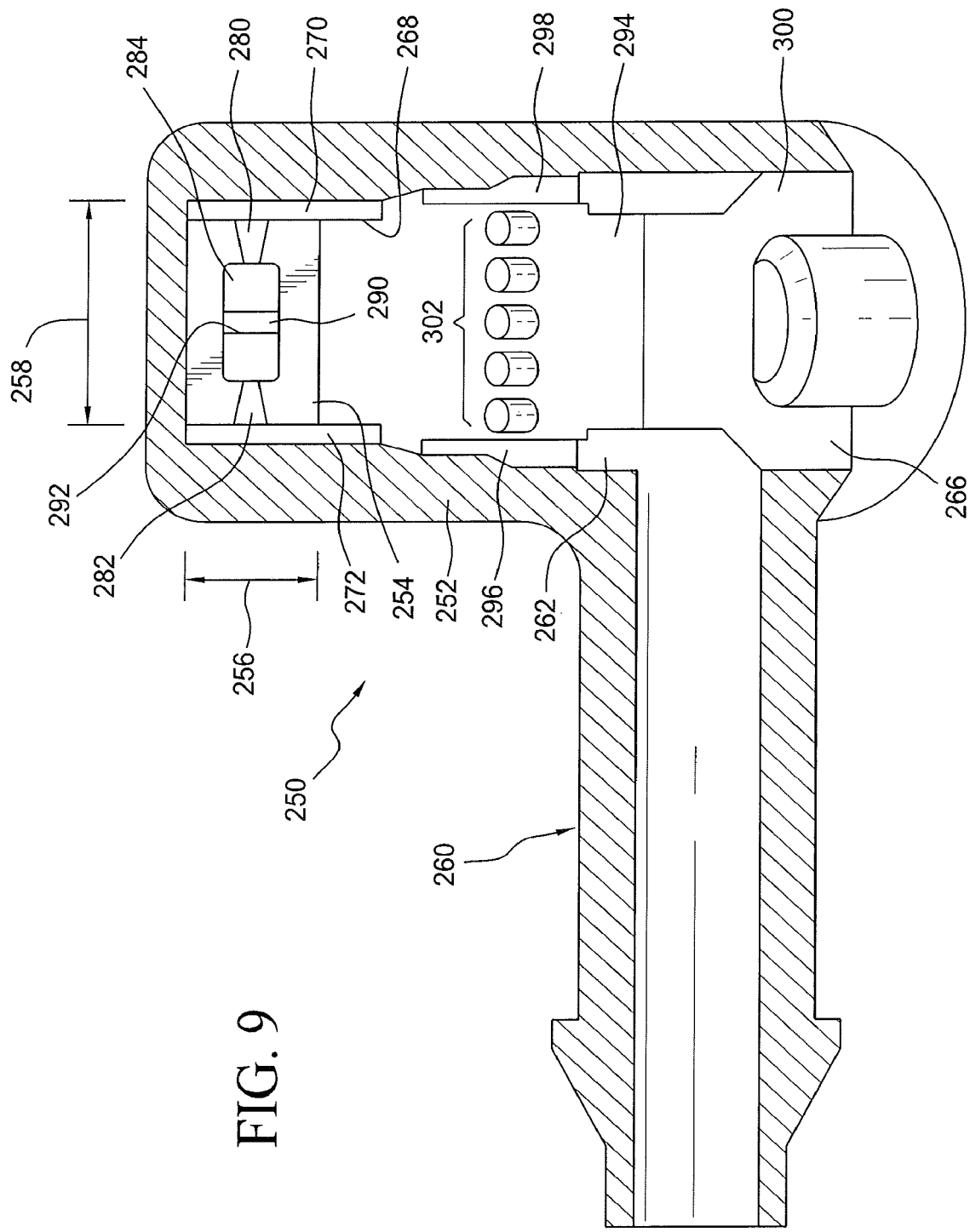
FIG. 9 illustrates a second embodiment of a micro fluidic oscillator wash or spray nozzle assembly providing enhanced sealing, insert retention and freeze/thaw stress resistance, in accordance with the present invention.

Alternative embodiments have also shown promise and allow for integrating the micro-fluidic nozzle of the present invention in different configurations. Such an alternative embodiment is illustrated in FIG. 9, wherein a washer nozzle assembly 250 for automotive applications incorporates a housing 252 configured to receive a micro-sized insert 254, having dimensions that are restricted so that insert height, indicated by arrow 256, is less than half of the insert width, indicated by arrow 258; for example the insert may be 3 mm (height)×7 mm (width)). The insert cooperates with a spray orifice in the housing so that the assembly 250 operates in a manner similar to the previously-described nozzle assembly 100. Accordingly, it generates spray pattern that is a uniform spray fan (15°-80°) with low flow rate (50-350 ml/min at 15-22 psi), and a selected thickness of 6° to 25°, meaning the nozzle 250 can produce a spray fan which is 15-80 degrees wide along a lateral width axis and 6 to 25 degrees thick in the transverse vertical height axis, and is well suited for generating a satisfactory spray even with cold, viscous fluids (having viscosities of up to 25 cP).

The illustrated nozzle assembly incorporates a conduit 260 for connecting an interior cavity 262 in the housing 252 to a suitable source of fluid under pressure (not shown). The cavity has a bottom opening 266 and an upper slot 268 for receiving and securing the insert, with the walls of the insert engaging the inner walls of the slot in the manner described above with respect to housing 110. First and second fluid passageways 270 and 272 on opposite sides of the insert 254 direct fluid under pressure from the cavity 262 through corresponding opposed power nozzles 280 and 282, accelerating the fluid into an interaction region 284 to produce opposed pressurized fluid flow in the region 284, causing fluidic oscillation vortices and ejection of the fluid out through a transverse exit throat 290 to outlet orifice 292 as a spray fan along a spray axis (as above). The cross sectional shape of that throat and outlet orifice are defined by the housing sidewall aperture which is axially aligned with a spray axis and the insert's interaction region, as in the embodiments described above.

The insert 254 may be secured to, or may form the upper portion of, an insert carrier 294 which extends the vertical length of the housing 252 and which is positioned in the cavity 262 by guides 296 and 298. The bottom end 300 of the carrier is enlarged and shaped to engage and fill the bottom end 266 of the cavity 262. In the assembly method for nozzle assembly 250, insert 252 is positioned in the housing by the carrier 294 by way of the bottom opening 266 and is pressed into the upper slot 268 to align with the outlet throat 290 and to abut a top wall of the slot, in the manner discussed with respect to assembly 100, the insert being substantially perpendicular to the direction of spray discharge (not shown in FIG. 9). Carrier 294 may optionally include an array of fluid filter pins 302 to remove particulates contaminating the fluid (or if a second array of properly sized, spaced and positioned pins are introduced (not shown) to reduce eddies in the fluid flow)), and, when the assembly is complete, as shown in FIG. 9, the bottom end of the carrier 294 seals the opening 266 through which it is installed.

In the embodiment illustrated in FIG. 9, the size of throat window is preferably 0.7 mm×0.35 mm. In order to make manufacturing and tooling nozzle assembly 250 more efficacious, the outlet orifice or throat window 284 is formed by both the insert's throat/chamber aperture and the housing sidewall's throat aperture (not shown), but the throat aperture could be formed solely in the sidewall of housing 252. A significant advantage of insert assembly 250 and the method for assembling this nozzle is its enhanced insert/housing sealing, insert retention and freeze/thaw stress resistance.

Having described preferred embodiments of a new and improved method, it is believed that other modifications, variations and changes will be suggested to those skilled in the art in view of the teachings set forth herein. It is therefore to be understood that all such variations, modifications and changes are believed to fall within the scope of the present invention as set forth in the claims.

What is claimed is:

1. A method for assembling a micro-sized fluidic oscillator wash or spray nozzle assembly, comprising:
    (a) defining within a nozzle housing an interior cavity having an upper slot in fluid communication with a bottom opening which is configured to receive and retain an insert for defining internal fluid passages extending along opposite edges of the insert and leading to first and second power nozzles and having an interaction region wherein the slot is enlarged at its opposite sides to define the fluid passages and to allow the fluid to flow into the power nozzles;
    (b) providing, in said insert, the first and second power nozzles configured to receive pressurized fluid from the interior cavity of the housing by way of opposing lateral inlets leading to the first and second power nozzles to produce accelerating first and second fluid flows aimed by the first and second power nozzles toward one another in the interaction region defined within the insert;
    (c) defining, within said housing a transverse lumen aligned along a spray axis through a sidewall in the housing to form a throat or spray outlet orifice, where the cross sectional shape of that throat or outlet orifice is defined by the housing's sidewall and the insert, when said insert is inserted in said housing's interior cavity, where the sidewall of the housing is oriented generally perpendicular to the bottom opening; and
    (d) inserting said insert into said nozzle housing through said bottom opening and forcing the insert upwardly into the upper slot to abut wall surfaces within the housing.

2. A micro-sized fluidic nozzle assembly, comprising:
    a housing having an internal fluid cavity for receiving fluid under pressure, said cavity having an open bottom and an upwardly extending slot;
    said housing including an upper portion having front, back and top walls surrounding and defining said slot, and having a forwardly-extending throat that is a transverse lumen aligned along a spray axis through said front wall and terminating in a spray orifice, said front wall is oriented generally perpendicular to said open bottom;
    an insert mountable within said slot in contact with and secured by interior surfaces of said front, back and top walls, said insert incorporating an interaction region within said housing that is aligned with said spray axis and said throat when said insert is secured in said slot;
    wherein the cavity includes internal fluid passages extending along opposite edges of the insert and leading to a first power nozzle and a second power nozzle, wherein the slot is enlarged at its opposite sides to define the fluid passages and to allow the fluid to flow into the power nozzles, said first power nozzle and second power nozzle of said insert are in fluid communication with said cavity and with said interaction region for accelerating and directing fluid from said cavity into said interaction region in opposition to each other to produce fluidic oscillating vortices in said interaction region and ejecting said fluid through said throat and said orifice to generate a patterned spray.

3. The nozzle assembly of claim 2, wherein said insert is positioned in said slot through the open bottom of said cavity so that said interaction region comprises a volume defined partly within the insert and partly within the tapering throat or spray outlet orifice defined through the sidewall in the housing.

4. The nozzle assembly of claim 3, further including an insert carrier for positioning said insert in said slot and for sealing the open bottom of the fluid cavity.

5. The nozzle assembly of claim 3, wherein said open bottom of said cavity is connectable to a pressurized fluid source.

6. The nozzle assembly of claim 2, wherein said throat is formed by inwardly and forwardly curving walls formed in said housing front wall.

7. The nozzle assembly of claim 6, wherein said insert interaction region cooperates with said curving walls to form said throat.

8. The nozzle assembly of claim 2, wherein said upper portion of said housing has exterior dimensions of 7 mm in width, 3 mm in depth and 9 mm in height, and wherein said insert is 0.85 mm thick.

9. The nozzle assembly of claim 2, wherein said patterned spray is a uniform spray fan having a spray angle of 15°-80°, when supplied from a fluid source at a flow rate of 50-350 ml/min at 15-22 psi, and wherein the spray fan may have a selected thickness of 6° to 25°.

10. The nozzle assembly of claim 9, wherein said patterned spray is generated when said housing is supplied with a cold fluid having a viscosity of up to 25 cP.

11. The nozzle assembly of claim 2, wherein the transverse lumen is aligned generally perpendicularly relative to the upwardly extending slot of the housing.

* * * * *